Figure 1:
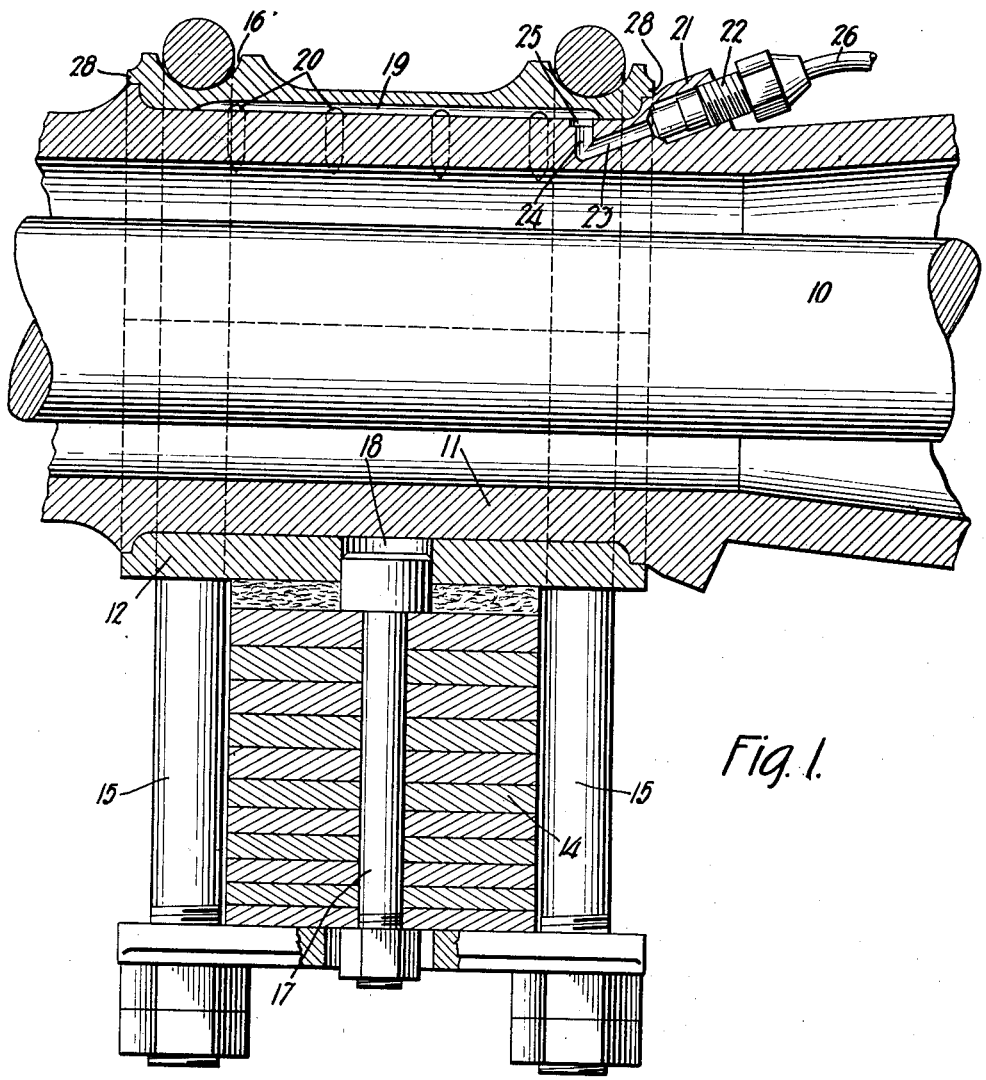

Oct. 17, 1933.  J. BIJUR  1,930,465
LUBRICATING INSTALLATION
Filed June 28, 1927  3 Sheets-Sheet 1

Inventor
Joseph Bijur.
by
Dean, Fairbank, Obrieght & Hirsch.
his Attorneys

Oct. 17, 1933.  J. BIJUR  1,930,465
LUBRICATING INSTALLATION
Filed June 28, 1927   3 Sheets-Sheet 2

Inventor
Joseph Bijur.
by
Dean, Fairbank, Obrieght & Hirsch
his Attorneys

Oct. 17, 1933.    J. BIJUR    1,930,465
LUBRICATING INSTALLATION
Filed June 28, 1927    3 Sheets-Sheet 3
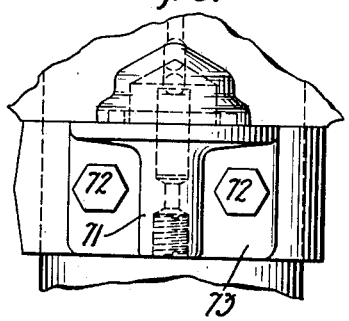
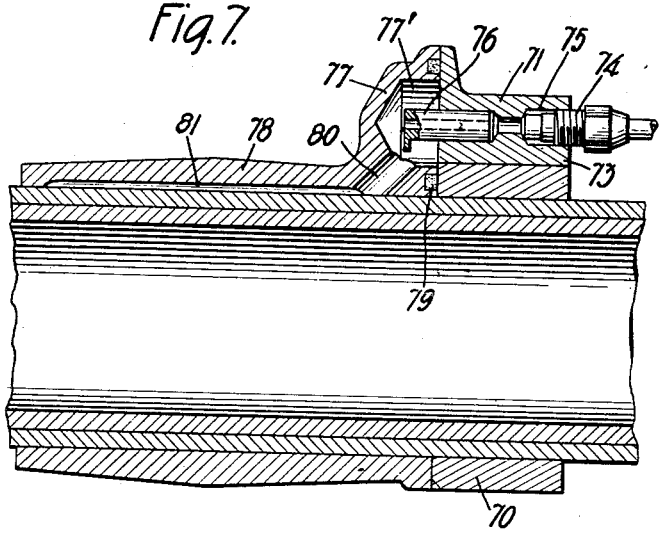
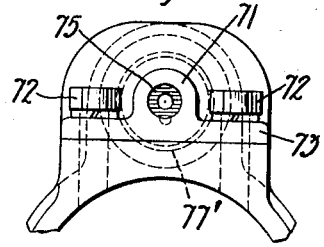
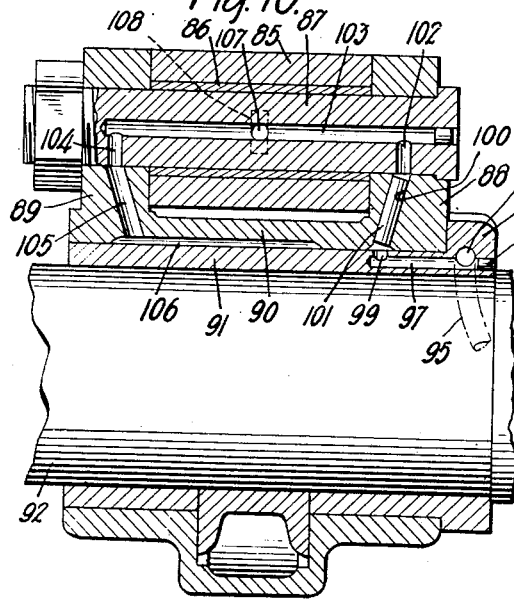
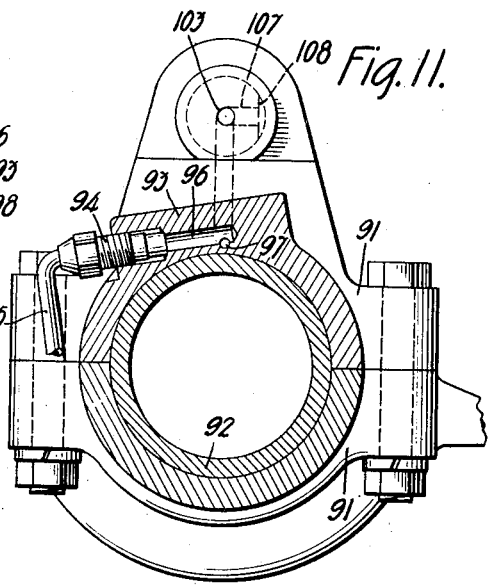
Inventor
Joseph Bijur.
by
Dean, Fairbank, Obright & Hirsch
his Attorneys Patented Oct. 17, 1933

1,930,465

UNITED STATES PATENT OFFICE 1,930,465

LUBRICATING INSTALLATION

Joseph Bijur, New York, N. Y., assignor to Auto Research Corporation, a corporation of Delaware Application June 28, 1927. Serial No. 202,004

36 Claims. (Cl. 184—7)

My present invention is concerned primarily with chassis lubrication and more particularly with the lubrication of the oscillating bearings having reciprocating movements of relatively slight amplitude particularly axle mounts such as the saddles of vehicle springs.

It is an object of the invention to readily lubricate a spring axle mount construction and similar oscillating bearings from a central source, without undue strain on a connecting conduit, that has only the requisite flexibility to accommodate the relative movement between the frame and the axle of the vehicle.

Another object is to provide an adequate yet not excessive supply of lubricant to the loaded surface of the axle mounts and similar oscillating bearings, without the entry of dust, dirt, or water.

Another object is to accomplish said results with little or no alteration in the construction of the axle, and without weakening the bond between the axle and the spring or reducing the thickness or strength of any of the parts thereof.

According to the invention in a preferred embodiment the lubricant is introduced at the upper, usually the loaded side of the mount, from which it spreads toward the lower or unloaded side, preferably along shallow channels that afford substantial resistance to flow and are capillary in action, so that the load carrying parts are adequately lubricated.

The lubricant is admitted to the bearing of the mount through an inlet hub, sleeve, collar or boss rigid with the axle housing, extending laterally of the spring mount, and associated in dust-tight non-leaking relation with the oscillating spring mount.

The inlet may be rigid with or an integral part of the hollow axle housing or it may constitute a part of the brake shield hub, which encircles and is rigidly affixed to the hollow axle.

In the spring saddle embodiments, the lubricant passage from the fixed inlet part to the oscillating saddle bearing is preferably an undercut bore extending through the saddle-carrying structure under the end of the saddle and opening into the loaded part of the saddle bearing, the ends of which have preferably a dust-tight relation with respect to the axle. Thus the oil admitted through the inlet is delivered to the saddle bearing without leak and without the entry of foreign particles to the path of flow thereof.

In other embodiments, the lubricant traverses the lateral contact surface between the saddle and the inlet collar or ring, a gasket preferably encircling the oil passage and effecting a dusttight and oil-tight swivel between the contacting surfaces of the collar or ring and the saddle. The lubricant may in one application be admitted to the saddle by a nozzle extending across the adjacent surfaces of saddle and ring or collar and dripping into a bore within the saddle to the loaded bearing surface thereof.

In a shackle embodiment for mounting the axle end of a cantilever spring the foregoing principles may be embodied preferably by applying the lubricant inlet upon the brake shield hub which is fixed to the axle housing and carries the hub of the shackle. The lubricant admitted to the hub is fed through one shackle link to lubricate the spring bolt at the upper end thereof, excess returning through the other shackle link to the loaded side of the hub bearing.

Figure 2:
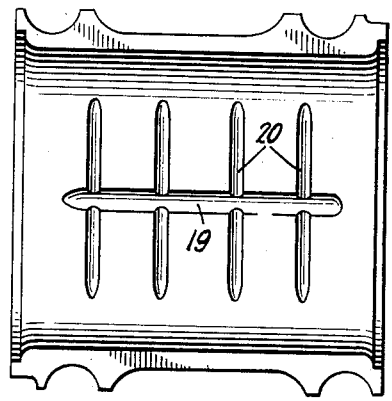
Figure 3:
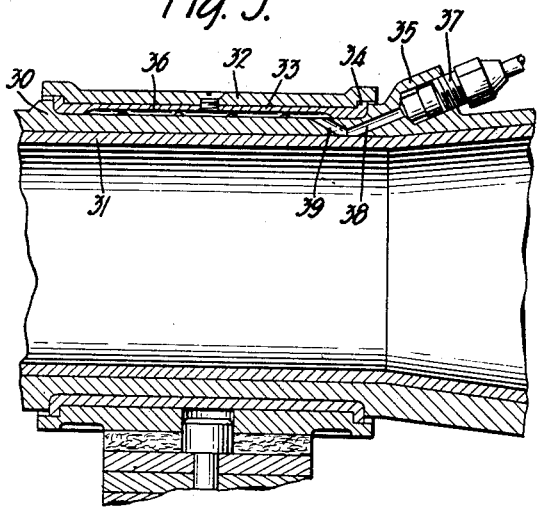
Figure 4:
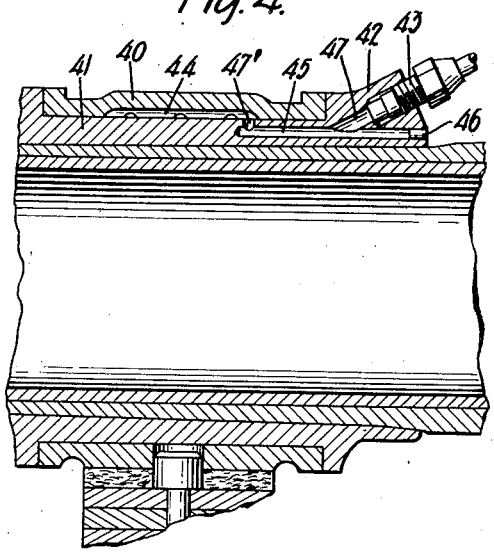
Figure 5:
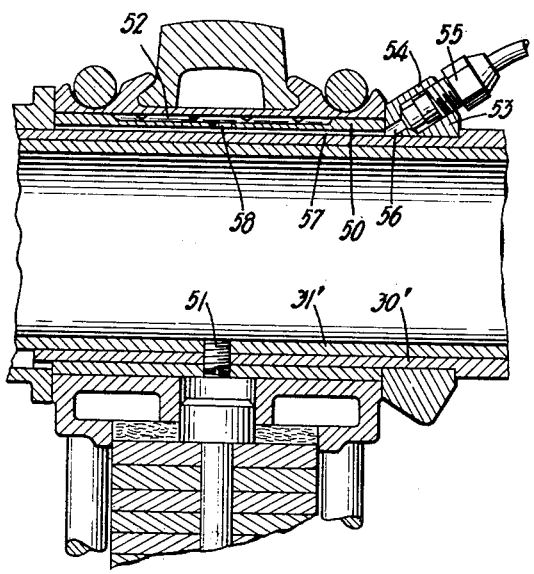
Figure 6:
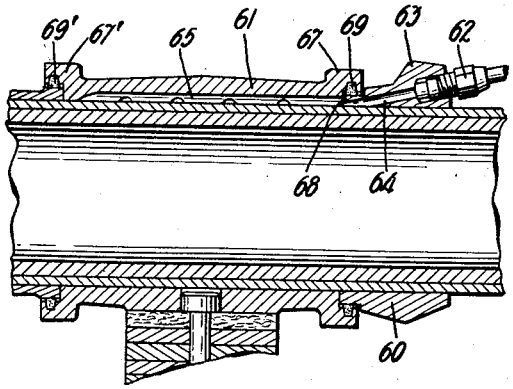

In the accompanying drawings in which are shown one or more of various possible embodiments of the several features of the invention, Fig. 1 is a view in longitudinal cross-section of one embodiment of the lubricated spring saddle, Fig. 2 is a plan view of the upper segment thereof from the interior, Fig. 3 is a view similar to Fig. 1 of a modification, and shown on a smaller scale, Figs. 4, 5 and 6 are similar views of other modifications, Fig. 7 is a fragmentary view in longitudinal cross-section of still another modification, Fig. 8 is a plan view of the embodiment of Fig. 7, Fig. 9 is an end elevation of the embodiment of Figs. 7 and 8, Fig. 10 is a view in longitudinal cross-section of a shackle embodiment for a cantilever spring, and;

Fig. 11 is a view in longitudinal cross-section of Fig. 10.

In the drawings, there is shown the rear axle 10 of a motor vehicle, enclosed by the hollow axle housing 11 constituting a fixed core encircled by and mounting the usual spring saddle 12. In the embodiment shown, the vehicle spring 14 extends below the saddle to which it is clamped by U-bolts or clips 15 lodged in corresponding grooves 16 in the saddle, the leaves of the spring being maintained in proper alignment by a bolt 17 which extends into a corresponding aperture 18 in the lower part of the spring saddle. The spring saddle includes a pair of bearing segments which are held together by the U-bolts 15 to embrace the hollow axle housing.

The saddle structure which, as thus far described, is conventional in construction, requires lubrication essentially at the loaded usually the upper part thereof, at which the load of the vehicle is usually localized. In order to adequately lubricate said bearing, the upper bearing segment of the saddle is provided preferably with a longitudinal oil groove 19 at the crest thereof from opposite sides of which a plurality of extremely shallow grooves 20 extend downward, preferably each through an arc of about 45 degrees. From the construction set forth, it will be apparent that any oil admitted at the end of the longitudinal groove 19 will proceed lengthwise thereof and will divide by flow along the descending grooves 20, from which it is caused to spread over the upper or loaded surface of the saddle by capillary action. Were a freer passage provided or permitted, much of the lubricant applied at the loaded surface would trickle down around the bearing and escape from the relatively loose or unloaded part therebelow, without adequately lubricating the loaded surface.

In order to admit lubricant to the bearing surface, from a source on the frame, without undue strain on, or rupture of the intervening piping or tubing due to the oscillation of the saddle about the axle structure, I have provided a boss or enlargement 21 exteriorly of the axle housing, which boss may either be forged as an integral part therewith or welded thereonto. The boss is disposed immediately beyond one end of the saddle and affords an inlet for mounting the pipe end, or the drip plug 22 or other flow control terminal thereof. In the specific embodiment shown, the lubricant is conveyed through a passage in the axle housing to the groove 19. This passage preferably comprises a bore 23 axially aligned with the socket 21 and meeting a radial bore 24, the upper or outer end of which registers with the end of the longitudinal groove 19. If desired, the axle housing may have a flat 25 thereon adjacent bore 24, so that the bore will always be in open communication with the oil groove 19 in each of the various positions assumed by the spring saddle during use.

By the construction described, it will be seen that the lubricant from the central source (not shown) will pass through the drip plug 22 simultaneously with the flow to other bearings. The drip plug 22 being fixed relatively to the axle housing, the supply conduit 26 that leads from the vehicle frame, is not called upon to take up the movement due to the oscillation of the saddle.

The lubricant in its passage through bore 23, 24 from the drip plug, to groove 19, does not have to traverse any crack, joint or other fitted part and is not exposed to the air. The saddle is firmly mounted in the corresponding depression in the axle housing and has lips or flanges 28 therebeyond, overlapping the corresponding edges of the housing, thereby excluding dust or dirt from the bearing surface. Accordingly, the lubricant is reliably delivered without leak and free from dust, dirt or water, at the oil groove 19 in the spring saddle, from which it spreads in the manner previously described.

The drip plug being at level higher than the longitudinal bearing groove 19, lubricant from the drip plug, in excess of that filling bore 23—24 will naturally overflow into said groove for lubricating the saddle bearing.

The embodiment of Fig. 3 shows an application to a slightly modified axle construction. In this embodiment, the brake shield is formed with a hub 30 unitary therewith, securely affixed upon the axle housing 31. The spring saddle in this embodiment, includes an inner bronze or brass bearing or bushing portion 33, with outstanding end flanges between which the outer split steel portion 32 of the saddle is lodged. A boss 35 is cast with or welded upon the brake shield hub 30. A longitudinal oil groove 36 in the bronze wear bushing 33 is supplied with lubricant from the drip plug 37 through an under-cut bore, which includes a pair of oblique segments, segment 38 coaxial with the boss 35, opening through the hub 30, and a segment 39 communicating with the extremity of the oil groove 36 and meeting the open end of the bore 38. By reason of the tight fit of the hub 30 upon the axle housing, the oil admitted to bore segment 38 will not escape about the axle housing, though bores 38 and 39 are drilled through the inner wall of hub 30, as shown.

In Fig. 4 is shown another modification which may be applied to an axle construction, such as that shown in Fig. 3. I have here shown the spring saddle 40 devoid of a liner sleeve and mounted in a corresponding depression upon the brake drum hub 41, the outer part of said hub being formed with a boss 42 mounting the drip plug inlet 43, as in the other embodiments. The lubricant, in this embodiment, passes from the drip plug to the longitudinal bearing groove 44 in the loaded side of the saddle, by way of a longitudinal bore 45 drilled from the extremity of the hub 41 and plugged at its outer end at 46. The oblique bore 47 extends axially of the drip plug and delivers into bore 45. A cross-slot 47' in the hub 41 establishes communication from the inner end of the longitudinal bore 45 to the extremity of the oil groove 44 at the loaded side of the saddle.

In all of the embodiments thus far described, the oil is conveyed from the drip plug to the bearing, through a unitary part fixed with respect to the axle housing, and without flow across any crack or gap. While such construction is preferred, I have shown other serviceable embodiments.

Fig. 5, for instance, shows an embodiment of spring saddle construction, the bearing or wear bushing 50 of which is firmly secured by a friction fit and by a screw 51 in fixed position upon the brake shield hub 30' which in turn is rigidly secured about the axle housing 31'. The wear bushing 50 is provided with the longitudinal oil groove 52 at the outer or wear face thereof. In order to lubricate the spring saddle bearing, there is friction-fitted upon the axle housing and in snug engagement therewith, a ring 53 of sufficient thickness for an inclined socket 54 to lodge the end of the controlling drip plug 55 therein. The inner end of the oblique bore 56 leading from the socket 54 through the ring, is in direct communication with a longitudinal groove 57 extending the entire length of the inner or press-fitted surface of the bushing, and, in turn, communicating through a port 58 between the ends thereof with the oil groove 52 at the loaded outer side of the wear surface of the bushing.

In Fig. 6 is shown an alternative embodiment in which a ring 60 is rigidly mounted upon the axle housing in contiguity with the end of the spring saddle 61. In this embodiment, the lubricant from the drip plug 62 mounted in boss 63 on ring 60, is directed through an oblique bore 64 in the ring, directly into the open end of the oil groove 65 in the upper or loaded side of the saddle. To prevent the entry of dust or dirt through the vertical contact surface between the saddle and the ring, the saddle preferably is formed with the flange extension 67 encircling the corresponding reduced extremity 68 of the ring and having an under-cut groove therein accommodating a felt ring or gasket 69 compressed thereby upon the inlet ring 60. A similar dust-proof construction is provided at the opposite end of the saddle at which the corresponding parts bear the same reference numerals primed.

In the embodiment of Figs. 7, 8 and 9 the drip plug carrying ring 70 is provided with a mounting fixture 71 affixed thereto as by bolts 72 through a flange 73 thereof. The drip plug 74 fits in a corresponding socket 75 in the outer face of the ring, and a drip nozzle 76 is affixed in a socket at the inner face of said fixture, in alignment and in open communication with the drip plug. The nozzle end of the drip nozzle protrudes into a corresponding cavity 77' in a hollow boss 77 enclosing said nozzle and preferably forged with, or welded onto the upper segment of the spring saddle 78. Preferably, a gasket 79, fitted in a corresponding circular groove in the hollow boss renders the contact surface between the said boss and the fixture 71 a dust-tight one. The drip from the nozzle is intercepted by an oblique bore 80 in the saddle which drains to the inlet end of the lubricant groove 81 longitudinally of the loaded side thereof. By the construction thus described, the lubricant is reliably conveyed past a vertical crack or joint without the possibility of leaking therefrom. The rocking movement of the saddle is not interfered with by the adjacent ring 70, for the cavity 77' in boss 77 is of sufficient width to permit this movement with respect to the protruding nozzle 76.

In Figs. 10 and 11 there is illustratively shown an embodiment applied to the end of a cantilever spring connected by means of a shackle to the axle.

The eye 85 of the spring has a bushing 86 which encircles the spring bolt 87 lodged in the arms 88 and 89 of the shackle yoke. The bearing hub 90 of the shackle yoke encircles the brake shield hub 91, which is affixed upon the hollow axle housing 92. In the present embodiment, I have provided upon said brake shield hub 91, a boss 93 which may be forged therewith or welded thereon and mounts transversely therein, the drip plug 94 supplied from the pipe 95. A bore 96 in the boss, axially of the drip plug communicates at its inner end with a bore 97 longitudinally of the hub 91 and plugged at 98 at its outer end. Bore 97 which extends substantially the thickness of shackle link 88 supplies the various bearings of the shackle, by means of an arrangement closely similar to that of my prior Patent No. 1,618,122 of February 15, 1927. It may, accordingly, be briefly stated that the longitudinal bore 97 communicates with the cross slot 99 leading to an upwardly extending bore 100 in the adjacent yoke arm 88. Bore 100 communicates with the radial bore 102 in the bolt 87, tightly fitted in the shackle arm and this, in turn, communicates with a longitudinal bore 103 through the bolt. The opposite end of bore 103 drains through radial bore 104 to bore 105 in shackle arm 89, which, in turn, delivers to the end of a lubricant groove 106 in the upper or loaded side of the yoke hub. As and for the same purpose, as in my prior patent, the bore 100 is substantially filled with a hollow pin 101 therein. The upper bolt 87 is lubricated preferably by such oil as escapes through a radial bore 107 extending outward from axial bore 103 and preferably opening at a flat 108 at the side of the bolt 87.

The arrangement of oil distributing grooves shown in Fig. 2 is preferably also employed in each of the other embodiments disclosed, although it will be understood, that if the branch or peripheral grooves 20 were omitted, reasonably satisfactory lubrication would be effected in certain cases. Said peripheral grooves are illustratively omitted from the embodiments of Figs. 7 to 11.

While I have referred throughout the specification, to the use of a drip plug at the inlet ring or boss, for supplying the saddle or other spring mount, and while said construction is preferred, it is understood that I may substitute measuring valves or other flow control fittings or that the control of the lubricant may occur at some more remote point, in which case the pipe end would be directly connected at the ring or boss.

In the embodiments of Figs. 3 to 11, I have, for simplicity, omitted showing the live or rotating axles within the respective axle housings.

While the invention is primarily intended and is preferred for central lubrication, it will be apparent that an oil cup or other local supply of lubricant could be applied in lieu of the drip plug for a non-centralized system.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

The various novel features of the lubricant installation of the present invention may be applied to other bearings than chassis bearings, or may be applied to other chassis bearings than the spring mount bearings specifically illustrated.

I claim:

1. In apparatus of the character described a relatively fixed core and a bearing encircling the same for slight oscillatory movement thereon, means for supplying lubricant to said bearing, said means including a groove longitudinally of the loaded side of the bearing wear surface, a lubricant inlet fixedly mounted with respect to the core exteriorly thereof and beyond one end of the oscillating bearing member, the apparatus being provided with a rigid duct leading from said inlet to said groove.

2. In apparatus of the character described, a relatively fixed core, a bearing encircling said core and having a limited oscillatory movement thereon, means for supplying lubricant to said bearing and comprising a part fixed on said core exteriorly thereof and extending beyond one end of said bearing, a lubricant supply terminal in said fixed part and a passage through said fixed part in communication with the wear surface of the bearing said bearing surface being dust excluding at its ends, said passage affording direct admission to the bearing surface from between the ends of the latter.

3. In apparatus of the character described a relatively fixed hollow mounting core, an eccentrically loaded bearing member about said core having a limited oscillating movement thereon and having an oil distributing groove at its loaded face, and means for supplying lubricant to said bearing, said means comprising a structure rigid with the mounting core exteriorly thereof and contiguous to said bearing, said structure having a lubricant inlet at one face thereof displaced radially outward with respect to the wear surface of said bearing, and a passage through said structure having an inclined part and leading into the bearing surface, said passage substantially excluding dust and dirt from the path of oil flow to the bearing.

4. In apparatus of the character described, a hollow mounting hub, a bearing member encircling said hub and having oscillatory movement thereon, means comprising a lubricant inlet fixed at the exterior of the hub beyond the end of the bearing and a lubricant-tight passage from said socket extending to the wear surface of said bearing through a course exteriorly of said hub and terminating at a part intermediate the ends of said wear surface, and at the loaded side thereof and a system of grooves distributing the oil substantially throughout the wear surface.

5. In apparatus of the character described a hollow mounting hub, a bearing member encircling said hub and having oscillatory movement thereon, means for admitting lubricant from an external source to said bearing at a point intermediate the ends thereof, said means comprising a lubricant inlet socket fixed at the exterior of the mounting hub beyond an end of the bearing, a lubricant-tight passage from said socket extending under said bearing from the end thereof, and opening outwardly to the loaded side of said bearing surface and a system of capillary oil grooves distributing the oil substantially throughout the wear surface.

6. In a motor vehicle structure a fixed hollow axle housing, a spring saddle having a bearing encircling said housing and having an oscillating movement thereon, an oil groove longitudinal of the bearing surface and along the loaded side thereof, means for supplying lubricant to said bearing, said means comprising an inlet boss affixed with respect to the axle structure exteriorly thereof and beyond an end of the bearing and a bore leading therefrom through the structure of the rigid axle housing and opening outwardly in registry with the longitudinal groove.

7. In a motor vehicle the combination of a hollow axle housing, a spring saddle encircling said housing and having an oscillating bearing mount thereon, a boss formed with a unitary part of said axle housing beyond one end of said saddle and at the upper part of the axle housing and a passage leading from said boss through the structure of said axle housing, said passage having an oblique inwardly extending segment with its inner end encircled by the saddle and an outwardly extending segment delivering therefrom substantially into the loaded side of the saddle bearing.

8. In a motor vehicle construction, the combination of a hollow axle housing, a sleeve structure encircling said housing and rigidly mounted thereon, a vehicle spring mount including a bearing member encircling said sleeve and having an oscillating bearing thereon, means for supplying lubricant to said bearing, said means including a lubricant inlet affixed to said sleeve and a passage therefrom extending through said sleeve and delivering to said bearing.

9. In a motor vehicle a hollow axle housing a wheel mounting sleeve rigidly affixed about said axle housing, a spring saddle encircling said sleeve and having an oscillating bearing mount thereon, an enlargement rigid with said sleeve beyond one end of said saddle, a lubricant inlet in said enlargement and a passage from said enlargement opening to said saddle bearing between the ends thereof to supply the lubricant thereto.

10. In apparatus of the character described, a hollow mounting structure, a vehicle spring supporting part encircling said mounting structure for oscillating movement with respect thereto, a member encircling said mounting structure and rigid therewith, having a part extending beyond one end of the bearing, said encircling member having an inlet for admission of lubricant and a passage through said encircling member opening under the end of the spring supporting part at the loaded side thereof.

11. In a motor vehicle, the combination of a hollow axle housing, a brake shield hub rigidly affixed to one end of said housing, a spring saddle including a soft metal wear lining encircling said hub and lodged in a corresponding peripheral depression therein to afford a substantial seal at the ends thereof, said liner having a longitudinal oil groove at the loaded side thereof, a unitary boss on said sleeve laterally of the saddle for accommodating a lubricant inlet, an oblique bore from said boss closed at its inner end by the axle housing and an outwardly directed oblique bore communicating therewith and opening into said oil groove.

12. In a motor vehicle, the combination of a hollow axle housing, a spring saddle encircling the same, said saddle including a soft metal liner having a longitudinal groove in the outer surface thereof terminating between the ends thereof, a collar encircling said housing, in snug engagement therewith and tightly pressed against the end of said saddle, a lubricant inlet in said collar, a longitudinal groove in the inner face of said liner in communication at one end with the inlet in said collar, and a port through said sleeve communicating between said grooves.

13. In a motor vehicle, the combination of an axle housing, a spring saddle having a bearing encircling the same, for oscillating movement thereabout, a sleeve rigid with the axle housing and beyond one end of said saddle, a lubricant inlet mounted on said sleeve, a passageway from said inlet to the loaded side of said saddle, and a gasket encircling said passageway and sealing the connection between the sleeve and the saddle.

14. In a motor vehicle, the combination of a hollow axle housing, a spring saddle encircling said housing and having an oscillating bearing thereon, a sleeve about said housing and rigid therewith and in end to end engagement with said saddle, dust excluding means intervening between the saddle and the contiguous part of the sleeve, a lubricant inlet at said sleeve, and a passage leading threfrom through said sleeve past the contacting surface with said saddle into the loaded side of said saddle.

15. The combination of an axle housing, a spring saddle encircling the same and having an oscillating bearing thereon, an enlargement rigid with the axle housing and adjacent the end of said saddle, a lubricant inlet in said enlargement, a passageway including a drip nozzle protruding beyond the enlargement over a part of the saddle, and a passageway through the saddle conveying the drip to the bearing surface of the saddle.

16. In a motor vehicle, the combination of a hollow axle housing, a spring support bearing encircling said axle housing and sustaining the load upon one side of said housing, a longitudinal oil groove at the upper side of said bearing surface, a plurality of short, shallow capillary grooves extending peripherally along the bearing from said longitudinal groove to spread the oil along the loaded surface and to minimize leak from the unloaded side thereof, and a lubricant inlet arrangement for feeding lubricant radially outwardly into said grooves from inside said spring support bearing.

17. In a motor vehicle structure, a spring saddle comprising a bearing encircling the fixed axle housing, said housing having parts coacting with the ends of said bearing to substantially exclude foreign particles from the wear surface thereof, means for supplying lubricant to the wear surface of the saddle, said means comprising a structure rigid with the axle housing, exteriorly of and beyond one side of the bearing and having a mounting socket for a lubricant supply pipe and a passage from said socket extending through parts rigid with the housing, directed under the upper part of said saddle and having an outwardly directed delivering end leading to the wear surface of said bearing.

18. In a motor vehicle structure, a spring saddle comprising a bearing encircling the fixed axle housing, said housing having parts coacting with the ends of said bearing to substantially exclude foreign particles from the bearing surface thereof, and means comprising structure rigid with the axle housing exteriorly thereof and beyond one end of the bearing and having a mounting socket for a lubricant supply terminal, and a passage from said socket extending through parts rigid with the housing and directed inward and opening to the bearing of the saddle, one of the coacting parts of the bearing surface having a longitudinal groove in alignment with the supply port, from which the lubricant spreads over the wearing area of the bearing.

19. In a motor vehicle, a fixed hollow axle housing, a spring saddle bearing encircling said housing, and having an oscillating movement thereon, an oil groove longitudinal of the bearing surface and along the loaded face thereof, means for supplying lubricant to said bearing, said means comprising an inlet boss affixed with respect to the axle structure exteriorly thereof and beyond an end of the bearing, and a continuous bore through portions rigid with the axle housing, said bore directed obliquely inward, through structure rigid with the axle housing and delivering by flow outward into said longitudinal oil groove.

20. In a motor vehicle, the combination of a hollow axle housing, a spring saddle encircling the same, said housing having upstanding ledges engaging the ends of said saddle, said saddle having an oscillating bearing mount upon said housing, means for supplying lubricant to said bearing, said means comprising a boss rigid with the housing exteriorly thereof and beyond one end of the saddle, for accommodating a lubricant inlet terminal and a passage emptying into the bearing, said passage extending obliquely inward from said socket to a part encircled by the saddle and delivering outward therefrom into the loaded side of the bearing surface.

21. In a motor vehicle, the combination of a hollow axle housing, a spring saddle encircling said housing and having an oscillating bearing mount thereon, said housing affording flanges snugly engaging the ends of said saddle for substantially sealing the bearing surface of the saddle, a longitudinal oil groove at the loaded side of the saddle, means for supplying lubricant from an external source to said longitudinal groove, said means comprising a boss rigid with the axle housing and exteriorly thereof beyond one end of the saddle, and a passage leading from said boss through structure rigid with the axle housing, said passage having an oblique inwardly extending segment with its inner end encircled by the saddle, and an outwardly extending segment delivering therefrom substantially into the end of said groove.

22. In a motor vehicle construction, the combination of a hollow axle housing, a sleeve structure encircling said housing and rigidly mounted thereon, a vehicle spring mounting including a bearing member encircling said sleeve and having an oscillating bearing thereon, a groove longitudinally of the loaded side of the bearing wear surface, a lubricant inlet affixed to said sleeve and a passage therefrom extending through said sleeve and delivering to said groove.

23. In a motor vehicle, the combination of a hollow axle housing having a rigid sleeve structure, a spring saddle encircling said housing and having a bearing mount, an enlargement adjacent said spring saddle rigid with said axle housing and extending outward therefrom, a lubricant inlet in said enlargement and a passage leading therefrom longitudinally of said housing and exteriorly thereof through said rigid sleeve structure, said passage having an outwardly directed outlet leading to the loaded side of said saddle.

24. The combination of a hollow axle housing having a soft metal sleeve rigidly affixed thereon, an oil groove longitudinally of the sleeve at the wear side thereof, a spring saddle encircling said sleeve and having an oscillating movement thereon, a collar encircling said housing and rigid therewith and pressed into snug engagement with the extremity of said sleeve, said collar having an inlet terminal for a lubricant pipe, a longitudinal groove in said sleeve communicating at one end with said inlet, and a port through said sleeve communicating from said inner to said outer groove.

25. In a motor vehicle, the combination of a hollow spring housing, a spring saddle encircling the same and having an oscillating bearing thereon, an enlargement rigid with the housing and laterally of the saddle affording an inlet for a lubricant pipe, a passage through said enlargement leading to the loaded side of said saddle, and a gasket sealing the connection between the enlargement and the saddle and located in a plane between the ends of said passage.

26. The combination of a hollow axle housing, a spring saddle encircling the same, a sleeve fixed upon said housing and in end to end engagement with said saddle, one of said engaging elements having a socket at the place of engagement, a longitudinal oil groove along the bearing surface of said saddle, a yielding gasket ring lodged in a corresponding groove between said engaging elements, and a passage through said sleeve communicating with said oil groove across the engaging surface between the saddle and the sleeve.

27. The combination of an axle housing, a spring saddle thereabout having an oscillating bearing thereon, a boss rigid with the housing, a hollow boss rigid with the saddle, said bosses in face engagement with each other, a lubricant inlet at the exposed side of said axle housing boss, a port through said boss including a drip nozzle protruding into the hollow of the saddle boss, and an oblique bore through said latter boss and through said saddle for conveying the drip to the loaded side of the bearing surface.

28. The combination of a hollow axle housing, a spring saddle encircling the same and having an oscillating bearing thereon, a sleeve about said axle housing rigid therewith, a block affixed to the upper side of said sleeve, a hollow boss rigid with said saddle at the upper part thereof and in face to face engagement with said block, a yielding gasket compressed in a corresponding groove between the block and the boss, a lubricant inlet at the exposed side of said block, a horizontal bore through said block, a drip nozzle in said block protruding into the hollow boss, and an oblique bore from said boss to the upper part of the bearing of said saddle to drain the lubricant dripping from said nozzle to said bearing.

29. In an apparatus of the character described, a relatively fixed core and a bearing encircling the same for oscillatory movement thereon, carrying a load pressing vertically downwardly through the core axis, and means for supplying lubricant to said bearing, said means including a lubricant inlet fixedly mounted with respect to the core, exteriorly thereof, and beyond one end of the oscillating bearing member, said apparatus being provided with a rigid duct leading from the inlet to the wear surface of the bearing at the top thereof directly at the point of load application.

30. In an apparatus of the character described, a relatively fixed core, a bearing encircling the same for slight oscillatory movement thereon, carrying a load pressing vertically downwardly, and means for supplying lubricant to said bearing, said means including an inlet duct extending longitudinally of the core at the center of the loaded portion thereof to substantially within the portion of the core encircled by the bearing, a distributing duct longitudinally of the bearing and substantially parallel to the inlet duct and also extending along the center of the loaded surface of the bearing, and a transverse passageway connecting said ducts within the encircling portion of the bearing.

31. In apparatus of the character described, a relatively fixed structure, a sleeve rigidly affixed thereon, and a structure carrying a load pressing vertically downwardly, encircling said sleeve and having a bearing mount thereon for oscillating movement thereof, a lubricating installation including means for supplying lubricant to said structure, said means including a lubricant inlet in a part rigid with said sleeve, and passages through said part and through the sleeve and structure from said inlet, leading lubricant to the bearing portion of said structure, said inlet and said passages being all positioned adjacent the upper side of the fixed structure and substantially in the plane of the application of the load.

32. A lubricating installation, comprising relatively fixed and movable bearing elements, one of which encircles the other, a bearing bushing therebetween fixed to one of said elements, and means for supplying lubricant to the contacting bearing surfaces, comprising grooves in the inside and outside of the bushing, a passageway through the bushing connecting said grooves, and an inlet supplying lubricant to the groove not in the bearing surface of the bushing.

33. A lubricated structure, comprising relatively fixed and movable bearing elements, a socket element rigid with the movable element, an inlet mounting rigid with the fixed element, a lubricant inlet associated with said inlet mounting, a nozzle also associated with said inlet mounting in communication with said inlet and draining into said socket, and means for preventing the entrance of dirt and dust into the course of flow from the nozzle to the socket.

34. A lubricated installation, comprising a relatively fixed core, a bearing encircling the same for slight oscillatory movement thereon, a boss rigid with the core, a boss rigid with the bearing, said bosses being in face engagement with each other and said bearing boss having a socket closed by said engagement, a lubricant inlet at the exposed side of the core boss, a port through said core boss, including a drip nozzle distributing into the socket in the bearing boss, and a conduit from said socket through the bearing for conveying lubricant to the bearing surface.

35. In a motor vehicle, the combination of a hollow axle housing having a rigid sleeve structure, a spring saddle encircling said housing and having a bearing mount, an enlargement adjacent said spring saddle rigid with said axle housing and extending outward therefrom, a lubricant inlet in said enlargement and a passage leading therefrom longitudinally of said housing and exteriorly thereof through said rigid sleeve structure, said passage having an outwardly directed outlet leading to the loaded side of said saddle, said saddle being mounted in a corresponding depression in the sleeve to afford a seal at the end thereof, and one of the coacting bearing elements of the saddle having a longitudinal oil groove at the loaded side thereof, in communication with an end of said passage.

36. In a motor vehicle, the combination of a hollow axle housing having a rigid sleeve structure, a spring saddle encircling said housing and having a bearing mount, an enlargement adjacent said spring saddle rigid with said axle housing and extending outward therefrom, a lubricant inlet in said enlargement and a passage leading therefrom longitudinally of said housing and exteriorly thereof through said rigid sleeve structure, said passage having an outwardly directed outlet leading to the loaded side of said saddle, said spring saddle being lodged in a corresponding depression in the sleeve and having a longitudinal oil groove with which the outwardly directed passage communicates.

JOSEPH BIJUR.